United States Patent [19]

Maresca et al.

[11] 4,296,232

[45] Oct. 20, 1981

[54] PROCESS FOR PREPARING POLYARYLATES IN THE PRESENCE OF A DIPHENYL ETHER COMPOUND AND A CATALYST

[75] Inventors: Louis M. Maresca, Belle Mead; Peter J. Gill, North Brunswick; Mitchell H. Berger, Somerville, all of N.J.

[73] Assignee: Union Carbide Corporation, New York, N.Y.

[21] Appl. No.: 70,039

[22] Filed: Aug. 27, 1979

[51] Int. Cl.³ .................. C08G 63/18; C08G 63/28; C08G 63/30; C08G 63/66
[52] U.S. Cl. .................. 528/179; 528/125; 528/126; 528/128; 528/173; 528/176; 528/194; 528/206; 528/207; 528/222; 528/225; 528/271
[58] Field of Search ............... 528/179, 173, 206, 207, 528/125, 126, 128, 271, 222, 225, 176, 194

[56] References Cited

U.S. PATENT DOCUMENTS

| | | | |
|---|---|---|---|
| 2,595,343 | 5/1952 | Drewitt et al. | 528/179 |
| 3,225,003 | 12/1965 | Macon | 528/179 |
| 3,317,464 | 5/1967 | Conix | 528/179 |
| 3,329,653 | 7/1967 | Beavers et al. | 528/179 |
| 3,684,766 | 8/1972 | Jackson, Jr. et al. | 528/179 |
| 3,780,148 | 12/1973 | Jackson, Jr. et al. | 528/179 |
| 3,824,213 | 7/1974 | Stackman | 528/179 |
| 3,948,856 | 4/1976 | Stackman | 528/179 |
| 4,075,173 | 2/1978 | Maruyama et al. | 528/179 |

*Primary Examiner*—Lester L. Lee
*Assistant Examiner*—Amelia B. Yarbrough
*Attorney, Agent, or Firm*—Donald M. Papuga

[57] ABSTRACT

Described herein is a process for preparing polyarylates which comprises reacting a diester derivative of a dihydric phenol with an aromatic dicarboxylic acid in the presence of from about 10 to about 60 weight percent of a diphenyl ether compound at a temperature of from about 260° to about 350° C. and in the presence of a magnesium catalyst.

19 Claims, No Drawings

PROCESS FOR PREPARING POLYARYLATES IN THE PRESENCE OF A DIPHENYL ETHER COMPOUND AND A CATALYST

BACKGROUND OF THE INVENTION

This invention is directed to a process for preparing polyarylates having a reduced viscosity of from about 0.5 to greater than 1.0 dl/g, which process comprises reacting the diester derivative of a dihydric phenol with an aromatic dicarboxylic acid in the presence of from about 10 to about 60 weight percent, based on the weight of the polyarylate produced, of a diphenyl ether compound at a temperature of from about 260° to about 350° C. and in the presence of a catalytically effective amount of a magnesium catalyst.

Polyarylates are polyesters derived from a dihydric phenol, particularly 2,2-bis(4-hydroxyphenyl)propane, identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative which is then reacted with an aromatic dicarboxylic acid to form the polyarylate. However, heretofore, the diacetate process has been carried out by several different methods using different types of solvents and catalysts as illustrated in the following U.S. patents:

In U.S. Pat. No. 2,595,343 issued May 6, 1952, an aromatic bisphenol is first reacted with acetic anhydride to form bisphenol diacetate which is then condensed with an aliphatic dicarboxylic acid to form a polyarylate by an acid interchange reaction. The condensation reaction is performed in the presence of an acid catalyst, such as para-toluenesulfonic acid, phosphoric acid or sulfuric acid. However, this acid exchange reaction does not yield an acceptable product when an aromatic dicarboxylic acid is substituted for the aliphatic acid.

U.S. Pat. No. 3,225,003 issued Dec. 21, 1965, describes the preparation of novel copolyesters by reacting hydroquinone diacetate with a mixture of hexahydroterephtalic acid and hexahydroisophthalic acid in the presence of a catalyst, such as sodium acetate, at a temperature of 230° C. The reaction is exemplified as being carried out in the presence of anhydrous sodium acetate catalyst and eutectic mixtures of biphenyl and diphenyl oxide (diphenyl ether) at 230° C. in three stages for a total reaction time of about 28 hours. Thus, this process requires long reaction times and several steps.

U.S. Pat. No. 3,317,464, issued May 2, 1967, describes the preparation of linear aromatic polyesters by the polycondensation of diphenols, or their diacetates, with polynuclear aromatic dicarboxylic acids. The examples of this patent describe the preparation of the polyester using catalysts, such as mixtures of p-toluene sulphonic acid and antimony trioxide or butyl orthotitanate, optionally in acetic acid. The reaction is carried out in a molten mixture of reagents and catalysts by heating these together under sub-atmospheric pressure. The patent states, but does not exemplify, that the reaction may be carried out in solution, in inert solvents, such as alpha-methylnaphthalene, biphenyl or diphenyl oxide.

U.S. Pat. No. 3,329,653 issued July 4, 1967 describes the preparation of high molecular weight linear condensation polymers, such as aromatic polyesters, aliphatic polyamides, and polycarbamides. These polymers are formed at or below the melting point of the polymer by carrying out the reaction while the reacting materials are suspended in an inert non-solvent medium, with a swelling agent for the condensation polymer which also needs to be present in the reaction medium. Example 7 of this patent describes the preparation of poly[2,2-bis(4-hydroxyphenyl)propane isophthalate] by heating a mixture of 780.9 g of the diacetate of Bisphenol-A, 415.3 g of isophthalic acid, 900 g. of Apco Inkol No. 0, 25 g of sulfolane swelling agent and 2.5 g of sodium methoxide catalyst. The reaction is held in reflux for 40 hours. The patent describes, as particularly effective swelling agents, sulfolane, diphenyl ether, and quinoline. Thus, this process requires the use of large quantities of a non-solvent, swelling agents as well as long reaction times.

U.S. Pat. No. 3,948,856 issued Apr. 6, 1976, describes an acid interchange polymerization process for producing an aromatic polyester by reacting substantially stoichiometric amounts of an aromatic diester with a dicarboxylic acid at a temperature of 220°-350° C., in a solvent, and in the presence of a catalyst. The solvent includes diphenyl ether, halogenated diphenyl ether, diphenyl sulfone, benzoquinone, polyphenyl ethers, etc. The catalyst is a mixture of a transition metal salt of a strong inorganic acid and a transition metal salt of an aliphatic carboxylic acid. In column 7 of the patent it is stated:

The term "transition metal" as used herein, is used in its normal sense and includes those metals of atomic numbers 21 through 29, 39 through 47, 57 through 79 and the known elements from 89 on. The preferred transition metals are those of Groups VIII (most preferably the iron-group metals, i.e., iron, cobalt and nickel) and Group VII (most preferably manganese).

Thus, this patent excludes magnesium (atomic number 12) U.S. Pat. Nos. 3,684,766 issued Aug. 15, 1972, and 3,780,148 issued Dec. 18, 1973, describe a variation of the diacetate process. In the patented processes, a prepolymer is formed from, for example, a diacetate, such as Bisphenol-A diacetate, and an aromatic acid, in the presence of a catalyst such as magnesium powder. The prepolymer so formed is then comminuted into small particles. These particles are then contacted with a crystallizing agent to crystallize the polyester. The crystallized polyester is heated in the presence of an inert gas and under reduced pressure to increase the inherent viscosity of the polyester. However, the processes described in these patents require multi-steps including the step of crystallizing the prepolymer.

U.S. Pat. No. 3,824,213 issued July 16, 1974, describes the preparation of halogenated aromatic polyesters by reacting in solution, an aliphatic carboxylic ester of a halogenated bisphenol, such as tetrachlorobisphenol-A with an aromatic acid mixture of terephthalic and isophthalic acids at a temperature of 220°-350° C., in the presence of a catalytically effective amount of a cobalt, nickel, or manganese salt of an aliphatic carboxylic acid. This patent describes that the esterification reaction may be conducted with said catalysts in a suitable solvent, such as hydrocarbon, halogenated aliphatic or aromatic hydrocarbon or the like (i.e. a solvent which is inert under the reaction conditions employed). Specifically these solvents include diphenyl ether, benzophenone, dichloroethane and dichlorobenzene. In Comparative Example B, in column 6 of this patent several catalyst materials were used to catalyze the reaction of 4,4'-isopropylidene-bis(2,6-dichlorophenol)diacetate, isophthalic acid and terephthalic acid in a diphenyl ether solvent.

The patent states in column 6, lines 68 to 75:

"Catalyst materials used include antimony oxide, zinc chloride, magnesium, magnesium oxide, magnesium acetate, triphenyl phosphine, sulfuric acid, phosphoric acid, hydrochloric acid, borontrifluoride and trifluoromethyl sulfonic acid all of which yield unacceptable polymers, in that the polymers have low I.V. values, and in the case of the acid-catalyzed reactions, the resulting polymers are dark-colored."

U.S. Pat. No. 4,075,173 issued Feb. 21, 1978, describes the preparation of copolyesters by reacting an aromatic dicarboxylic acid, a diacetate of Bisphenol-A, and an acetate of p-hydroxybenzoic acid. Various processes for producing polyarylates by the reaction of Bisphenol-A and terephthalic and isophthalic acids are reviewed in this patent. The following process for producing polyarylates, identified as route (1), is described in column 2, of the patent:

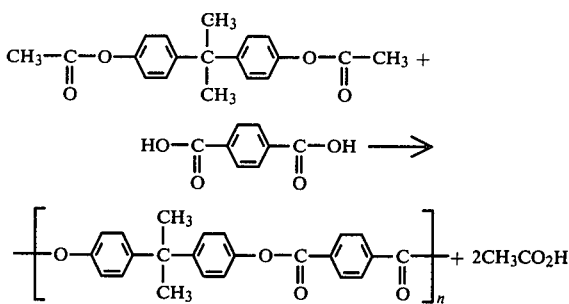

This process is the diacetate process as described herein, or the "Acetate process" as defined in the patent.

Column 2 of the patent states:

"The route (1) is not desirable because the undesirable coloration and deterioration of polymer are particularly remarkable as disclosed in the above-mentioned literature."

Further, column 3 of the patent states:

"On the other hand, the route (1), Acetate process, is economically advantageous because the materials used are cheap and the operation is simple. For example, diacetate of bishpenol-A, a monomer for Acetate process, is synthesized by merely reacting acetic anhydride and bisphenol-A. Consequently, it may be said that, if the fatal drawbacks of Acetate process, coloration and deterioration, are solved, Acetate process will become the most superior process."

Thus, the skilled workers in the field of polyarylate chemistry realize that the existing processes for producing polyarylates have one or more deficiencies, and that a need exists to develop a viable diacetate process for producing polyarylates.

In U.S. Pat. No. 4,075,173, a copolyester was prepared by the diacetate process by a solid-state polymerization of low molecular weight polymers without using crystalizing agents. The patentees state that their Acetate process is possible only when specific monomers are combined to form the prepolymer. These monomers are the diacetate of bisphenol-A, terephthalic acid and-/or isophthalic acid and an acetate of p-hydroxybenzoic acid. The prepolymer is then converted to the desired high molecular weight polymer by solid state polymerization.

Thus, the diacetate processes for producing polyarylates by the procedures of the aforediscussed U.S. Patents, and as stated in U.S. Pat. No. 4,075,173, are generally unsuitable since they are either economically unattractive and/or produce a commercially unmarketable product. These prior art processes utilize large amounts of solvents and generally long reaction times, high temperatures, as well as a complex series of steps, i.e. those as described in U.S. Pat. Nos. 3,684,766 and 3,780,148.

Therefore, a need exists for an economical and practical diacetate process for producing high molecular weight polyarylates.

In the diacetate process for producing polyarylates, problems exist which must be economically and practically solved in order to have a viable, economically attractive process. One problem when a diester derivative of a dihydric phenol is reacted with an aromatic dicarboxylic acid in the molten state is that sublimation of the diacid occurs. This disrupts the stoichiometry of the reaction and the polyarylate produced is not of acceptable molecular weight. To prevent sublimation of the diacid, several techniques have been developed. These include the use of large amounts of solvents together with a variety of catalysts and generally long reaction times in the polymerization process. However, these techniques are quite costly and do not provide an optimum process. Another problem when a diester derivative of a dihydric phenol is reacted with an aromatic dicarboxylic acid in the molten state is that the viscosity of the system increases dramatically towards the end of the reaction and therefore the reaction becomes diffusion controlled (the molecules are not close enough to insure rapid reaction) rather than kinetically controlled. Also, the polymer product is difficult to handle (i.e., removal from the reactor) due to this high viscosity.

Yet another problem in the production of polyarylates by the diacetate process is that a carboxylic acid is a by-product of the reaction of a diester derivative of a dihydric phenol with an aromatic dicarboxylic acid. In order to provide an efficient, economical process and a high molecular weight polyarylate, the acid, for example, the acetic acid has to be conveniently and efficiently removed.

It has now been discovered that a polyarylate having a reduced viscosity of at least about 0.5 to greater than 1.0 dl/gm, can be efficiently and economically produced. The present process comprises reacting a diester derivative of a dihydric phenol with an aromatic dicarboxylic acid in the presence of from about 10 to about 60 weight percent, based on the polyarlate produced, of a diphenyl ether compound at a temperature of from about 260° to about 350° C. and in the presence of a catalytically effective amount of a magnesium catalyst.

The utilization of from about 10 to about 60 percent of a diphenyl ether compound in the diacetate process prevents sublimation of the aromatic dicarboxylic acid; thus producing polyarylates of acceptable molecular weight. Also, the diphenyl ether compound provides for better removal of the acetic acid by-product. Further, an additional benefit in using a diphenyl ether compound in the amounts indicated is that the viscosity of the system is decreased. This decrease in viscosity provides a faster reaction time since better mixing of the reactants occurs which allows the reaction to proceed under kinetic control. Additionally, by using the specified diphenyl ether, reaction times are relatively short so that a polyarylate is produced generally in less than 10 hours at the reaction temperatures and the polyarylates produced possess lighter color, as compared to those utilizing longer reaction times. Furthermore, the present process can be carried out at atmospheric pressure and therefore avoids the use of the costly equipment which is needed by the prior art processes which carry out the diacetate process under vacuum. Also, contrary to the statement in U.S. Pat. No. 3,824,213, that the use of catalysts such as magnesium, magnesium oxide, and magnesium acetate yield unacceptable polymers of low intrimsic viscosity values, the present process using from about 10 to about 60 weight percent of a diphenyl ether compound and a catalytically effective amount of a magnesium catalyst in the diacetate process produces polyarylates having a reduced viscosity of from about 0.5 to greater than 1.0 dl/gm.

DESCRIPTION OF THE INVENTION

The present invention is directed to a process for the preparation of polyarylates having a reduced viscosity of from about 0.5 to greater than 1.0 dl/gm, which process comprises reacting a diester derivative of a dihydric phenol with an aromatic dicarboxylic acid in the presence of from about 10 to about 60 weight percent, based on the weight of the polyarylate produced, of a diphenyl ether compound at a temperature of from about 260° to about 350° C. and in the presence of a magnesium catalyst.

The present process comprises reacting:

(a) at least one diester derivative of a dihydric phenol having the following formula:

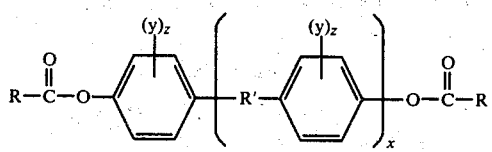

wherein R is independently selected from an alkyl radical having from 1 to about 6 carbon atoms, preferably methyl, cycloalkyl having from 4 to about 7 carbon atoms, y is independently selected from alkyl groups of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 to 8 carbon atoms, especially $C(CH_3)_2$, cycloalkylene, or cycloalkylidene radicals having up to and including 9 carbon atoms, O, S, SO, $SO_2$, and CO, x is 0 or 1; and (b) at least one aromatic dicarboxylic acid. The diester derivative of the dihydric phenol is prepared by reacting a dihydric phenol with an acid anhydride derived from acids containing from 2 to 8 carbon atoms under conventional esterification conditions. The preferred acid anhydride is acetic anhydride. Generally, the dihydric phenol is reacted with the acid anhydride in the presence of an esterification catalyst, either in the presence or absence of a solvent.

The dihydric phenols that may be used in this invention include the following:

2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
2,2-bis-(4-hydroxy-3,5-dichlorophenyl)propane,
4,4'-(dihydroxyphenyl)sulfone,
4,4'-(dihydroxyphenyl)sulfoxide,
4,4'-(dihydroxybenzophenone),
hydroquinone, and
naphthalene diols.

These dihydric phenols may be used individually or in any combination which when reacted with an aromatic dicarboxylic acid produces polyarylate polymers or copolymers that essentially do not crystallize during the reaction and recovery steps. The preferred dihydric phenol is 2,2-bis (4-hydroxy phenyl)propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 50:50. Also, from about 0.5 to about 20 percent of aliphatic diacids containing from 2 to about 10 carbon atoms, such as adipic acid, sebacic acid, and the like may be additionally used in the polymerization reaction.

The dihydric phenols and aromatic dicarboxylic acids are selected so that the polyarylate produced remains in an essentially amorphous state during the polymerization reaction and recovery step.

The reaction of the diester derivative of a dihydric phenol with the aromatic dicarboxylic acid is carried out in the presence of from about 10 to about 60, preferably from about 25 to about 40, and most preferably, from about 30 to about 40 weight percent, based on the weight of the polyarylate produced, of a diphenyl ether (also known as diphenyl oxide) compound. The diphenyl ether compound may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol.

The amount of the diphenyl ether compound could vary during the polymerization reaction. For example, it may be advantageous to increase progressively the amount of diphenyl ether compound to maintain the reaction medium at about constant viscosity.

The reaction of the diester derivative of the dihydric phenol with the aromatic dicarboxylic acid is performed with these reactants present in the ratio of from about 0.85:1.00 to about 1.10:1.00, preferably from about 0.98:1.02 to about 1.02:0.98, diester derivative:aromatic dicarboxylic acid.

The magnesium catalyst used in this invention is selected from magnesium, magnesium oxide and a magnesium salt of an inorganic acid, or organic acid or mixtures thereof. The salts of the organic acid include acetates, propionates, benzoates, oxalates, acetylacetonates, or mixtures thereof. The preferred catalyst is magnesium acetate. The catalyst is present in the reaction in a catalytically effective amount which can be, for example, from about 1 to about 1000, preferably from about 10 to about 50, parts per million, based in the weight of the polyarylate produced.

The process of this invention is carried out at a temperature of from about 260° to about 350° C. and preferably, from about 275° to about 295° C. The present process is generally conducted in an inert atmosphere (such as argon or nitrogen). The process is preferably carried out at atmospheric pressure although higher and lower pressures may be used. Obviously, at pressures higher than atmospheric pressure, higher temperatures will result.

The polymerization reaction is conducted for a period of time sufficient to produce a polyarylate having a reduced viscosity of at least about 0.5 to greater than 1.0 dl/gm, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired. Moreover, the reactants may be added to the polymerization zone in any way or order desired as long as the polymerization takes place in the presence of from about 10 to about 60 weight percent of a diphenyl ether compound and a magnesium catalyst.

The diester derivative of the dihydric phenol may be formed, in situ, by adding the dihydric phenol together with the acid anhydride, an aromatic dicarboxylic acid and a diphenyl ether compound to the reactor and the reaction carried out in a single reaction zone under combined esterification and polymerization conditions as described above. Additionally, the diester derivative of the dihydric phenol may be first prepared and then an aromatic dicarboxylic acid and a diphenyl ether compound added directly to the same reaction vessel with the polymerization being carried out under the conditions described above.

The polyarylate polymer having a reduced viscosity of at least about 0.5 is recovered in its final form by methods well known to those skilled in the art, such as by direct devolatilization in an extruder under conditions sufficient to remove the diphenyl ether compound, coagulation, spray drying and the like.

The polyarylates may also be prepared by first forming a polyarylate prepolymer having a reduced viscosity of from about 0.1 to about 0.4 dl/gm, by reacting the diester derivative of a dihydric phenol with an aromatic dicarboxylic acid in the presence of a diphenyl ether compound with or without the magnesium catalyst under the conditions described previously, for a reaction time of about 3 hours. The polyarylate prepolymer is then heated in the presence of the magnesium catalyst at temperatures of from about 300° to about 350° C. to obtain a polyarylate having a reduced viscosity of from about 0.5 to greater than 1.0 dl/gm.

Alternatively, the polyarylate prepolymer may be added directly, after its formation, to a vented extruder wherein the molecular weight is increased to form a polymer having a reduced viscosity of from about 0.5 to greater than about 1.0 dl/gm. For example, the molecular weight of polyarylate prepolymer is increased in the extruder at a temperature of from about 320° to about 350° C., under a vacuum of about 0.3 to about 2 mm Hg and a residence time of from about 10 to about 30 minutes.

The process of this invention produces normally solid polyarylates having a reduced viscosity of from about 0.5 to greater than 1.0, preferably from about 0.6 to about 0.8 dl/g, as measured in chloroform (0.5 g/dl chloroform) or other suitable solvent at 25° C. In those instances where the polyarylate is not soluble in chloroform, other solvents known in the art, such as para-chlorophenol, phenol/tetrachloroethane (60:40), and the like may be used. Reduced viscosities of the polyarylates measured in these solvents generally have the same range as those measured in chloroform.

The polyarylates may be prepared in the presence of materials such as molecular weight regulators, antioxidants, thermal stabilizers and the like.

The polyarylates obtained by the process of this invention may be used together with the well-known additives such as plasticizers, pigments, lubricating agents, mold release agents, stabilizers, inorganic fillers, and the like. These polyarylates may also be blended with other polymers.

EXAMPLES

The following examples serve to give specific illustrations of the practice of this invention but they are not intended in any way to limit the scope of this invention. In these examples, all parts and percentages are on a weight basis unless otherwise specified.

EXAMPLE 1

The reactor system consisted of a hot oil heated one gallon reactor fitted with a nitrogen inlet, mechanical agitator, and fractionating column (packed with ceramic saddles) connected to an overhead take-off device consisting of a condenser and a receiver.

The reactor was charged 1200 grams of Bisphenol-A diacetate, 319.1 grams of isophthalic acid, 319.1 grams of terephthalic acid and 275 grams of diphenyl ether (12 weight percent based on the polymer produced) and 100 parts per million, based on polyarylate produced, of magnesium acetate catalyst. The reactor system was purged with nitrogen for 20 minutes and then the heater turned on to raise the temperature of the reactor to about 280° C. (the oil heater was set at about 300° C.). Acetic acid started to distill when the temperature reached about 260° C. Acetic acid distillation was followed by measuring the level in the receiver. After about 3.0 hours at 280° C., the power draw on the agitator began to increase which indicated a viscosity increase. The reaction was terminated after 5.0 hours at reflux by discharging the contents of the reactor under nitrogen. The reaction product was allowed to cool to room temperature. The reaction product was ground to particles having an average size below ¼ inch and stored in an oven at 50°-60° C., for about 10-15 hours under a vacuum of 75 mm Hg. The polymer was isolated by feeding the reaction product to a single screw two vent extruder and flashing off the solvent. The barrel temperature of the extruder was 325° C., the first vent was under a vacuum of about 500 mm Hg, and the second vent was under a vacuum of about 15-20 mm Hg. The residence time of the polymer in the extruder was 2-5 minutes. The polymer had a reduced viscosity of 0.57 dl/g as measured in chloroform (0.50 gm/100 ml) at 25° C.

Table I shows the weight in grams of the diphenyl ether used, the weight percent of diphenyl ether used, based on the polymer produced, the reaction time in hours, and the reduced viscosity of the polymer produced.

EXAMPLES 2-6

The procedure as described in Example 1 was exactly repeated in Examples 2 to 6 except that the amounts of diphenyl ether shown in Table I, were charged to the reactor.

Table I shows the weight in grams of the diphenyl ether used, the weight percent of diphenyl ether used, based on the polymer produced, reaction time in hours, and reduced viscosity of the polymer produced.

EXAMPLE 7

The procedure as described in Example 1 was exactly repeated except that diphenyl ether was not used.

Table I shows the reaction time in hours and the reduced viscosity of the polymer produced.

The data in Table I show that without using diphenyl ether, the reducing viscosity of the polyarylate polymer produced was only 0.45 (Example 7). When magnesium acetate catalyst and diphenyl ether is used in amounts of from 12 to 40 weight percent (Examples 1 to 5), the polyarylate polymer produced has a reduced viscosity in the range of 0.57 to 0.72. However, when diphenyl ether is used in large amounts of 80 weight percent (Example 6) the polyarylate polymer produced has an unacceptable reduced viscosity of 0.20 dl/g.

TABLE 1

| Example | Diphenyl Ether, Amount Used (gm) | (wt. %) | Reaction time (hrs) | Reduced Viscosity of Polymer (dl/gm) |
|---|---|---|---|---|
| 1 | 275 | 12 | 5.0 | 0.57 |
| 2 | 460 | 25 | 4.0 | 0.66 |
| 3 | 590 | 30 | 4.5 | 0.67 |
| 4 | 740 | 35 | 5.0 | 0.67 |
| 5 | 918 | 40 | 5.0 | 0.72 |
| 6 | 2200 | 80 | 21 | 0.20 |
| 7 | 0 | 0 |  | 0.45 |

[1]Reaction time measured from start of reflux.

EXAMPLE 8

The apparatus used herein consisted of a 250 ml round bottom flask fitted with a nitrogen inlet, mechanical stirrer, a vacuum jacketed vigreux column connected to a distillation head and collector flask. 45.0 grams of 2,2',6,6'-tetrachlorobisphenol-A diacetate, 8.3 grams of isophthalic acid, 8.3 grams of terephthalic acid, 14.8 grams of diphenyl ether and 0.5 g of magnesium acetate were added to the flask. The reaction mixture was purged with nitrogen for about 60 minutes. The reaction mixture was then heated to about 260°-270° C. by immersion of the apparatus in a heating medium. Acetic acid started to distill after about one hour. The temperature was raised to 290° C. The reactants were maintained at this temperature for 2 hours. At this point the solution was very viscous. Diphenyl ether was removed by decreasing the pressure to 150 mm Hg and then to less than 1 mm Hg in a stepwise manner (about 50 mm Hg every 30 minutes). The reaction was continued for about 60 minutes at 290° C. and a pressure of about 1 mm Hg. The product was allowed to cool to ambient temperature.

Approximately 3 grams of the product was dissolved in methylene chloride (approximately 10 percent solids) and coagulated in isopropanol. The resultant material which was in the form of a fluff was washed with isopropanol two times and then dried at 120° C. (for 24 hours at <1 mm Hg pressure). The reduced viscosity of this polymer was measured in chloroform (0.50 gm/100 ml) at 25° C. and found to be 0.51 dl/gm.

What is claimed is:

1. A process for preparing a polyarylate having a reduced viscosity of from about 0.5 to greater than 1.0 dl/gm, which process comprises reacting:
   (a) at least one diester derivative of a dihydric phenol having the following formula:

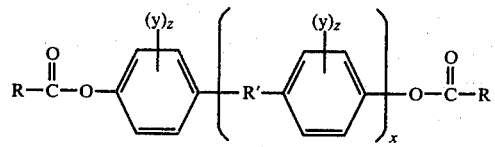

wherein R is independently selected from an alkyl radical having from 1 to about 6 carbon atoms or cycloalkyl having from 4 to about 7 carbon atoms, y is independently selected from alkyl groups of 1 to 4 carbon atoms, chlorine, or bromine, z independently has a value of from 0 to 4, inclusive, and R' is independently selected from a divalent saturated aliphatic hydrocarbon radical having 1 to 8 carbon atoms, a cycloalkylene, or cycloalkylidene radical having up to and including 9 carbon atoms, O S, SO, $SO_2$, CO, x is 0 or 1; with
   (b) at lease one aromatic dicarboxylic acid, in the presence of from about 10 to about 60 weight percent, based on the polyarylate produced, of a diphenyl ether compound, at a temperature of from about 260° to about 350° C. and in the presence of a catalytically effective amount of a magnesium catalyst.

2. A process as defined in claim 1 wherein the diester derivative of a dihydric phenol has the following formula:

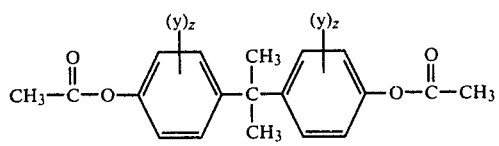

3. A process as defined in claim 2 wherein each z is 0.

4. A process as defined in claim 1 wherein the aromatic dicarboxylic acid is a mixture of isophthalic acid and terephthalic acid.

5. A process as defined in claim 4 wherein the isophthalic acid to terephthalic acid ratio in the mixture is about 20:80 to about 100:0.

6. A process as defined in claim 1 wherein the diphenyl ether is substituted with alkyl groups, chlorine, bromine, or any substituent which does not interfere with the polyarylate forming reaction.

7. A process as defined in claim 1 wherein the polyarylate produced has a reduced viscosity of from about 0.5 to about 0.8.

8. A process as defined in claim 1 wherein the diphenyl ether is present in an amount of from about 25 to about 40 weight percent.

9. A process as defined in claim 1 wherein the temperature is between about 275° to about 295° C.

10. A process as defined in claim 1 wherein the magnesium catalyst is a magnesium salt of an organic acid.

11. A process as defined in claim 10 wherein the catalyst is magnesium acetate.

12. A process for preparing a polyarylate having a reduced viscosity of from about 0.5 to greater than 1.0 dl/gm which process comprises reacting:

(a) an acid anhydride derived from acids containing from 2 to 8 carbon atoms;

(b) at least one dihydric phenol having the following formula:

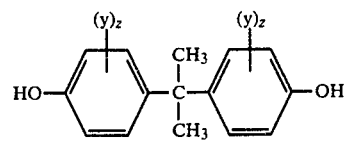

wherein y is independently selected from alkyl groups of 1 to 4 carbon atoms, chlorine or bromine, z independently has a value of from 0 to 4, inclusive, R' is independently selected from a divalent saturated hydrocarbon radical having 1 to 8 carbon atoms, a cycloalkylene, or cycloalkylidene radical having up to and including 9 carbon atoms, O, S, SO, $SO_2$, CO, x is 0 or 1; and (c) at least one aromatic dicarboxylic acid, in the presence of from about 10 to about 60 weight percent, based on the polyarylate produced, of a diphenyl ether compound, at a temperature of from about 260° to about 350° C. and in the presence of a catalytically effective amount of a magnesium catalyst.

13. A process as defined in claim 12 wherein the acid anhydride is acetic anhydride.

14. A process as defined in claim 12 wherein the dihydric phenol has the following formula:

15. A process as defined in claim 14 wherein each z is 0.

16. A process as defined in claim 12 wherein the aromatic dicarboxylic acid is a mixture of isophthalic acid and terephthalic acid.

17. A process as defined in claim 16 wherein the isophthalic acid to terephthalic acid ratio in the mixture is about 20:80 to about 100:0.

18. A process as defined in claim 12 wherein the magnesium catalyst is a magnesium salt of an organic acid.

19. A process as defined in claim 18 wherein the magnesium catalyst is magnesium acetate.

* * * * *